(12) United States Patent
Brady

(10) Patent No.: US 10,767,561 B2
(45) Date of Patent: Sep. 8, 2020

(54) METHOD AND APPARATUS FOR COOLING THE AMBIENT AIR AT THE INLET OF GAS COMBUSTION TURBINE GENERATORS

(71) Applicant: Stellar Energy Americas, Inc., Jacksonville, FL (US)

(72) Inventor: Thomas Brady, Oak Brook, IL (US)

(73) Assignee: Stellar Energy Americas, Inc., Jacksonville, FL (US)

( * ) Notice: Subject to any disclaimer, the term of this patent is extended or adjusted under 35 U.S.C. 154(b) by 1094 days.

(21) Appl. No.: 14/880,876

(22) Filed: Oct. 12, 2015

(65) Prior Publication Data

US 2016/0102613 A1 Apr. 14, 2016

Related U.S. Application Data

(60) Provisional application No. 62/062,493, filed on Oct. 10, 2014, provisional application No. 62/069,633, filed on Oct. 28, 2014.

(51) Int. Cl.
| | |
|---|---|
| *F02C 7/143* | (2006.01) |
| *F02C 7/141* | (2006.01) |
| *F02C 7/057* | (2006.01) |

(52) U.S. Cl.
CPC ............. *F02C 7/141* (2013.01); *F02C 7/057* (2013.01); *F02C 7/143* (2013.01); *F02C 7/1435* (2013.01)

(58) Field of Classification Search
CPC .......... F02C 7/04; F02C 7/143; F02C 7/1435; F02C 7/16; F01D 25/12; F01D 2260/212;
(Continued)

(56) References Cited

U.S. PATENT DOCUMENTS

| 1,781,541 A | 11/1930 | Einstein et al. |
|---|---|---|
| 2,336,066 A | 12/1943 | Cain |

(Continued)

FOREIGN PATENT DOCUMENTS

| DE | 19541915 A1 * | 1/1997 | ............ F02C 7/1435 |
|---|---|---|---|
| EP | 1923651 A1 * | 5/2008 | .............. F02C 7/052 |

(Continued)

OTHER PUBLICATIONS

1991 ASHRAE Handbook, "Chapter 39: Thermal Storage," ASHRAE Journal, 1991.

(Continued)

*Primary Examiner* — Gerald L Sung
*Assistant Examiner* — Marc J Amar
(74) *Attorney, Agent, or Firm* — Venable LLP; Michele V. Frank

(57) ABSTRACT

Embodiments provide a method and apparatus to lower the temperature and heat content of the ambient air at the inlet to a gas combustion turbine to enhance power generation. Embodiments can use multiple, staged direct contact air chillers, variable flow secondary water chilling systems, constant flow primary water chilling systems with water chilling units arranged for parallel chilled water flow, and a coolant water circulation system used for heat rejection with open cooling towers. Alternatives can use a chilled water thermal storage system, and/or waste heat to drive at least part of the water chilling process. With the included apparatus a method to allow adiabatic air chilling is available for operation during periods of lower ambient air conditions when needs for power augmentation may not be as great.

20 Claims, 5 Drawing Sheets

(58) Field of Classification Search
CPC .......... F05D 2250/51; B64D 2033/024; B64D 2033/0236
See application file for complete search history.

(56) References Cited

U.S. PATENT DOCUMENTS

| | | | |
|---|---|---|---|
| 2,689,467 A | | 9/1954 | Verber |
| 3,148,513 A | | 9/1964 | Ewing |
| 3,741,683 A | * | 6/1973 | McTamaney ............ G05D 9/12 417/7 |
| 4,031,180 A | * | 6/1977 | Bohanon .................... F24F 6/04 261/106 |
| 4,098,854 A | * | 7/1978 | Knirsch ..................... F28C 1/14 165/900 |
| 4,244,191 A | | 1/1981 | Hendriks |
| 4,244,517 A | | 1/1981 | Stanke et al. |
| 4,418,527 A | | 12/1983 | Schlom et al. |
| 4,446,703 A | | 5/1984 | Gilbertson |
| 4,463,574 A | | 8/1984 | Spethmann et al. |
| 4,483,152 A | | 11/1984 | Bitondo |
| 4,731,100 A | * | 3/1988 | Loeffelmann ...... B01D 46/0082 95/281 |
| 4,733,527 A | * | 3/1988 | Kidd ......................... F02C 3/30 60/39.3 |
| 4,792,091 A | | 12/1988 | Martinez, Jr. |
| 4,926,649 A | | 5/1990 | Martinez, Jr. |
| 4,951,460 A | | 8/1990 | Prochaska et al. |
| 5,012,646 A | | 5/1991 | Speer |
| 5,065,598 A | | 11/1991 | Kurisu et al. |
| 5,083,423 A | | 1/1992 | Prochaska et al. |
| 5,104,562 A | | 4/1992 | Kardos et al. |
| 5,111,875 A | | 5/1992 | Hammarstedt |
| 5,191,767 A | | 3/1993 | Kane et al. |
| 5,193,352 A | * | 3/1993 | Smith ....................... F02C 7/143 62/201 |
| 5,203,161 A | | 4/1993 | Lehto |
| 5,289,696 A | * | 3/1994 | Kiser ........................ F24F 6/04 62/305 |
| 5,321,944 A | | 6/1994 | Bronicki et al. |
| 5,386,685 A | | 2/1995 | Frutschi |
| 5,444,971 A | | 8/1995 | Holenberger |
| 5,457,951 A | | 10/1995 | Johnson et al. |
| 5,465,585 A | | 11/1995 | Mornhed et al. |
| 5,622,044 A | * | 4/1997 | Bronicki ............... F01K 21/047 60/39.182 |
| 5,632,148 A | | 5/1997 | Bronicki et al. |
| 5,655,373 A | | 8/1997 | Yamashita et al. |
| 5,724,828 A | | 3/1998 | Korenic |
| 5,758,502 A | | 6/1998 | Utamura et al. |
| 5,782,093 A | | 7/1998 | Yamashita et al. |
| 5,790,972 A | | 8/1998 | Kohlenberger |
| 5,894,739 A | | 4/1999 | Temos |
| 5,904,121 A | * | 5/1999 | Mezheritsky ...... F02M 25/0227 123/25 C |
| 5,925,291 A | | 7/1999 | Bharathan ................. F28B 3/02 261/112.2 |
| 5,966,953 A | * | 10/1999 | Murr ........................ A01K 1/0082 261/27 |
| 6,085,532 A | | 7/2000 | Sibik |
| 6,129,285 A | * | 10/2000 | Schafka ..................... F24F 3/14 236/44 C |
| 6,173,563 B1 | | 1/2001 | Vakil et al. |
| 6,185,946 B1 | | 2/2001 | Hartman |
| 6,206,348 B1 | * | 3/2001 | Imsdahl .................... F02C 7/143 261/103 |
| 6,209,330 B1 | | 4/2001 | Timmerman et al. |
| 6,301,897 B1 | | 10/2001 | Uchida |
| 6,318,065 B1 | | 11/2001 | Pierson |
| 6,324,867 B1 | | 12/2001 | Fanning et al. |
| 6,338,471 B1 | * | 1/2002 | Imsdahl .................... F28D 5/00 261/27 |
| 6,405,549 B1 | | 6/2002 | Baffes |
| 6,408,609 B1 | | 6/2002 | Andrepont |
| 6,422,018 B1 | | 7/2002 | Tisdale et al. |
| 6,470,686 B2 | | 10/2002 | Pierson |
| 6,769,258 B2 | | 8/2004 | Pierson |
| 6,848,267 B2 | | 2/2005 | Pierson |
| 7,343,746 B2 | | 3/2008 | Pierson |
| 7,644,573 B2 | | 1/2010 | Smith et al. |
| 7,716,930 B2 | | 5/2010 | Chillar et al. |
| 7,862,011 B2 | * | 1/2011 | Kammerzell ......... F24F 5/0035 261/106 |
| 8,163,072 B2 | * | 4/2012 | Kippel ............... B01D 46/0082 95/281 |
| 8,196,907 B2 | * | 6/2012 | Zhang ..................... F02C 7/04 261/116 |
| 8,220,784 B2 | * | 7/2012 | Nikolin ................. F02C 7/1435 261/118 |
| 8,356,466 B2 | | 1/2013 | Motakef et al. |
| 8,360,711 B2 | * | 1/2013 | Chillar .................... F02C 3/305 415/1 |
| 8,365,530 B2 | * | 2/2013 | Zhang .................... F02C 7/1435 60/39.3 |
| 8,382,887 B1 | * | 2/2013 | Alsaffar ............. B01D 46/0058 55/289 |
| RE44,079 E | | 3/2013 | Pierson |
| RE44,815 E | | 3/2014 | Pierson |
| 9,850,816 B2 | * | 12/2017 | Zhang ..................... F02C 7/143 |
| 9,982,901 B2 | * | 5/2018 | Mongar ................. F24F 3/1417 |
| 2001/0032477 A1 | * | 10/2001 | Schlom .................... F02C 7/143 62/310 |
| 2001/0054354 A1 | * | 12/2001 | Baudat ..................... F28C 3/06 95/214 |
| 2002/0056994 A1 | * | 5/2002 | Irish ........................ F02C 7/052 290/2 |
| 2002/0083712 A1 | * | 7/2002 | Tomlinson ............ F02C 7/1435 60/775 |
| 2004/0016245 A1 | * | 1/2004 | Pierson .................... F02C 7/143 62/175 |
| 2007/0122290 A1 | * | 5/2007 | Kamata ................... F04D 9/007 417/44.2 |
| 2008/0276617 A1 | | 11/2008 | Mak |
| 2009/0056303 A1 | * | 3/2009 | Araki ..................... F02C 7/1435 60/39.53 |
| 2010/0089023 A1 | * | 4/2010 | Harada .................... F02C 7/08 60/39.182 |
| 2010/0101234 A1 | * | 4/2010 | Birkner .................... C09D 1/00 60/806 |
| 2010/0319384 A1 | * | 12/2010 | Zhang ..................... F01D 25/007 62/271 |
| 2011/0042836 A1 | * | 2/2011 | Zhang ..................... F02C 7/04 261/101 |
| 2011/0074051 A1 | * | 3/2011 | Nikolin ................. F02C 7/1435 261/23.1 |
| 2011/0088399 A1 | | 4/2011 | Briesch et al. |
| 2012/0031596 A1 | | 2/2012 | Kippel et al. |
| 2012/0234020 A1 | * | 9/2012 | Nikolin .................... F02C 7/052 60/801 |
| 2013/0067922 A1 | | 3/2013 | Zhang et al. |
| 2015/0121881 A1 | * | 5/2015 | Zhang ..................... F02C 7/143 60/728 |
| 2016/0010493 A1 | * | 1/2016 | O'Dea ...................... F23N 5/18 60/776 |
| 2017/0284307 A1 | * | 10/2017 | Inoue ....................... F02C 7/28 |

FOREIGN PATENT DOCUMENTS

| | | | |
|---|---|---|---|
| GB | 2 175 679 A | | 12/1986 |
| GB | 2280224 A | * | 1/1995 ........... F01K 21/047 |
| JP | H11-173161 A | | 6/1999 |
| WO | WO-2007/149473 A2 | | 12/2007 |

OTHER PUBLICATIONS

1992 ASHRAE Handbook, "Heating, Ventilating, and Air-Conditioning Systems and Equipment," ASHRAE Journal, 1992.
1993 ASHRAE Handbook, "Design Guide for Cool Thermal Storage," ASHRAE Journal, 1993.
1994 ASHRAE Handbook, "Refrigeration," ASHRAE Journal, 1994.

(56) References Cited

OTHER PUBLICATIONS

1995 ASHRAE Handbook, "Heating, Ventilating, and Air Conditioning: Applications," ASHRAE Journal, 1995.
1996 ASHRAE Handbook No. 1, "Heating, Ventilating, and Air-Conditioning: Systems and Equipment," ASHRAE Journal, 1996.
1996 ASHRAE Handbook No. 2, "Heating, Ventilating, and Air-Conditioning: Systems and Equipment," ASHRAE Journal, 1996.
1996 ASHRAE Handbook No. 3, "Heating, Ventilating, and Air-Conditioning: Systems and Equipment," ASHRAE Journal, 1996.
Andrepont, J. et al., "Summer Peaking Capacity Via Chilled Water Storage Cooling of Combustion Turbine Inlet Air," American Power Conference, 1994.
"Applications Engineering Manual: Multiple-Chiller-System Design and Control," Trane, 2001.
Cawley, M.F. et al., "Flow visualization of free convection in a vertical cylinder of water in the vicinity of the density maximum," International Journal of Heat and Mass Transfer, 2003.
Clark, K. M., P.E. et al., "The Application of Thermal Energy Storage for District Cooling and Combustion Turbine Inlet Air Cooling," International District Energy Association, 1998.
Coad, W.J., P.E. et al., "A Fundamental Perspective on Chilled Water Systems," McClure Engineering Associates, 1998.
"Cogeneration in Power Plants: Staying cool for cogen," Worlwide Independent Power, 2002.
Cross, J.K. et al., "Modeling of Hybrid Combustion Turbine Inlet Air Cooling Systems," ASHRAE Transactions: Symposia, 2005.
"Database of U.S. CHP Installations Incorporating Thermal Energy Storage and/or Turbine Inlet Cooling," The Cool Soulutions Company, 2003.
Dharmadhikari, S., Ph.D. et al., "Contribution of Stratified Thermal Storage to Cost-Effective Trigeneration Project," ASHRAE Transactions: Symposia, 2000.
"Distributed Energy Program Report: Database of U.S. Combined Heat & Power (CHP) Installations Incorporating Thermal Energy Storage (TES) and/or Turbine Inlet Cooling (TIC)," Cool Solutions Company, 2004.
Dorgan, C. et al, "Design Guide for Cool Thermal Storage: Chilled Water Storage," ASHRAE Journal, 1993.
Ferreira, J. et al., "Cold Production from Heat," Energie-Cites/Ademe, 1998.
Fiorino, D. et al., "Achieving High Chilled-Water Delta Ts," ASHRAE Journal, 1999.
Fiorino, D. et al., "Twenty-Five Ways to Raise Your Chilled-Water Temperature Differential," ASHRAE Transactions: Symposia, 1996.
Gidwani, B.N. et al., "Optimization of Chilled Water Systems," Proceedings from the Ninth Annual Industrial Energy Technology Conference, 1987.
Grimm, N. et al., "HVAC Systems and Components Handbook," McGraw-Hill Professional, 1997.
Hartman, T.B., P.E., "Design Issues of Variable Chilled-Water Flow Through Chillers," The Hartman Company, 1996.
Holman, J.P. et al., "Thermodynamics: Second Edition," McGraw-Hill Book Company, 1974.
"Industrial Refrigeration Rotary Screw Process Chillers," Dunham-Bush, 2000.
"Large Chillers: Series or Parallel Flow?," Trane Engineer's Newsletter, 1977.

MacCracken, C.D. et al., "An Overview of the Progress and the Potential of Thermal Storage in Off-Peak Turbine Inlet Cooling," ASHRAE Transactions: Symposia, 1994.
McQuay, "Chiller Plant Design Application Guide," McQuay International, 2001.
Merriam-Webster's Collegiate Dictionary, 11th Edition, Merriam-Webster, Incorporatedd, 2008.
Mornhed, G. et al., "Innovations in District Heating and Cooling 1984-1994 and Their Economic Impact," ASHRAE Transactions: Symposia, 1995.
Office of Energy Efficiency & Renewable Energy, "Database (Report) of U.S. CHP Installations Incorporating Thermal Energy Storage (TES) and/or Turbine Inlet Cooling (TIC)," Cool Solutions Company, 2004.
Office of Energy Efficiency & Renewable Energy, "U.S. CHP Installations Incorporating Thermal Energy Storage (TES) and/or Turbine Inlet Cooling (TIC)," Cool Solutions Company, 2003.
Ondryas, I. et al., "Options in Gas Turbine Power Augmentation Using Inlet Air Chilling," The American Society of Mechanical Engineers, 1990.
Polimeros, G. et al., "Energy Cogeneration Handbook," Industrial Press Inc, 1981.
Punwani, D. et al., "A Hybrid System for Combustion Turbine Inlet Air Cooling at the Calpine Clear Lake Cogeneration Plant in Pasadena, Texas," ASHRAE Winter Meeting, 2001.
Reddy, A. et al., "Determining Long-Term Performance of Cool Storage Systems from Short-Term Tests," ASHRAE Research Project 1004, 1998.
Reeves, G.A. et al., "Commercial Cool Storage Deisgn Guide," GPU Service Corporation, 1985.
Sanjeev, J., P.E., et al., "Capacity Enhancement of ABB 11N1 with Thermal Energy Storage," Power Gen International, 1999.
Sanjeev, J., P.E., et al., "Inlet Air Cooling for a Frame 7EA based Combined Cycle Power Plant," Power Gen International, 1997.
"Section 1: Purpose of System," jb1393.kmc.
Stewart, W.E. Jr. et al., "Design Guide: Combustion Turbine Inlet Air Cooling Systems," ASHRAE, 1999.
Stewart, W.E. Jr. et al., "Improved Fluids for Naturally Stratified Chilled Water Storage Systems," ASHRAE, 1998.
"TICA Meeting Notes," Turbine Inlet Cooling Association, 2001.
Tong, W. et al., "Density inversion effect on transient natural convection in a rectangular enclosure," University of Colorado Department of Aerospace Engineering Sciences, 1993.
Trane et al., "Trane Duplex Centrifrugal Water Chillers CDHF (60 Hz): 1500-2800 Tons CDHG (50 Hz): 1200-2500 Tons," The Trane Company, 1997.
"Turbine Inlet Chilling System: Qaseem Power Plant Extension," GE International Power Systems, 1997.
"Turbine Inlet Cooling Association Partial Databse of Turbine Inlet Cooling Installations," Turbine Inlet Cooling Association, 2012.
"Turbine Inlet Cooling Case Studies," Energy-Tech, 2004.
"Turbine Inlet Cooling Systems," Internet Archive website from turbineairsystems.com, 2000.
Vogelsang, M. et al., "CoolTools Chilled Water Plant Design and Specification Guide," Pacific Gas and Electric Company, 2000.
"Water-Cooled Reciprocating Packaged Water Chillers," McQuay International, 1997.
International Search Report and Written Opinion in International Patent Application No. PCT/US2015/055381, dated Jan. 6, 2016.

\* cited by examiner

METHOD AND APPARATUS FOR COOLING THE AMBIENT AIR AT THE INLET OF GAS COMBUSTION TURBINE GENERATORS

CROSS-REFERENCE TO RELATED APPLICATION

This application claims priority to U.S. Provisional Patent Application No. 62/069,633, filed on Oct. 28, 2014, and U.S. Provisional Patent Application No. 62/062,493, filed on Oct. 10, 2014, the entire contents of which are incorporated herein by reference.

BACKGROUND

Technical Field

The present invention is in the technical field of electric power generation. More specifically, in the technical field of ambient air cooling at the inlet of gas combustion turbine generators.

Related Art

It is known to use water and air chilling systems to cool the ambient air at the inlet to gas combustion turbine generators. Doing so allows for an increased output of the gas turbines whenever the ambient air temperature is higher than the temperature of the air that can be produced by the chilling systems.

Current practice as presented in active or expired U.S. Pat. Nos. 5,193,352, 5,444,971, 5,790,972, 6,318,065, 6,470,686, and 6,769,258 have deficiencies in regards to energy efficiency when operating at either full design or reduced air cooling loads, and/or flexibility of operation to make use of non-mechanical and/or adiabatic air cooling, and/or in air filtration capability.

BRIEF SUMMARY

Embodiments of the present invention can cool ambient air at the air inlet to turbines in multiple stages by using a combination of indirect contact air chiller devices and direct contact air chiller devices. A direct contact air chiller device can be placed in the upstream or first position to come in contact with the ambient air. The temperature of the air leaving this first air chilling device can be controlled continuously by an industrial automation system, for example, through a combination of water flow rate and temperature set point adjustments. As the air passes through the upstream air chiller device airborne particles can be removed by the water that comes in contact with the air. Air that leaves the upstream air chiller device can enter the first downstream or second position air chiller device to be cooled further. The second position air chiller device can be either an indirect contact or direct contact air chiller. The temperature of the air leaving the second position air chilling device can be controlled continuously by an industrial automation system. Air that leaves the second position air chiller device can enter the gas combustion turbine inlet, or in an alternative case, can enter a third position air chiller device to be further cooled before supply to the gas combustion turbine inlet.

According to embodiments, chilled water that is supplied to each air chiller device can be provided by a water chiller system that is dedicated to the respective air chiller device. Each water chiller system can contain at least one water chiller unit that is arranged so that the chilled water flow is circulated to the evaporator on each water chiller in parallel with the chilled water flow to the other evaporators in the respective water chiller system.

BRIEF DESCRIPTION OF THE DRAWINGS

The foregoing aspects and other features and advantages of the invention are illustrated from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

Figure 1:
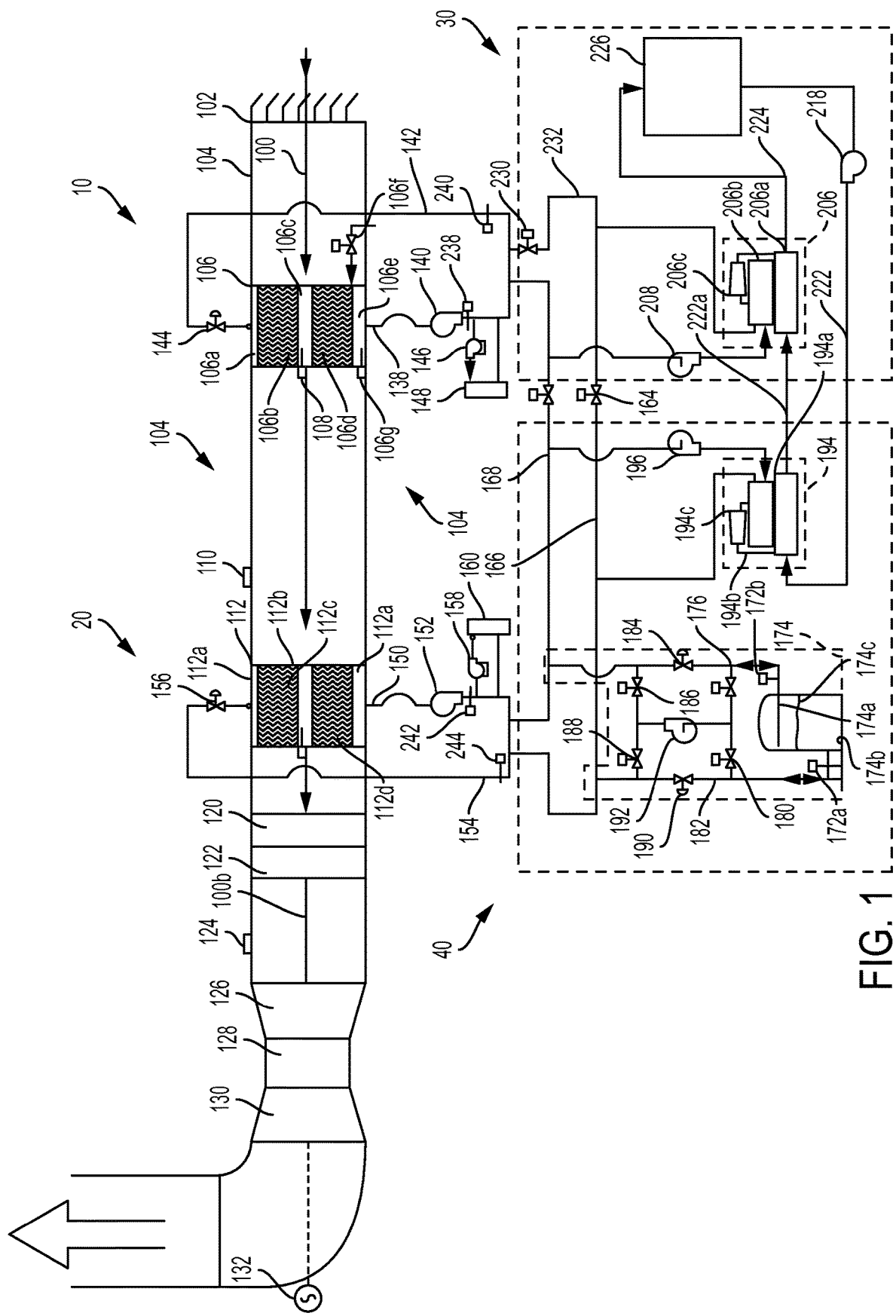
FIG. 1 is a schematic that shows an illustrative embodiment of ambient air chilling and water chilling systems at the air inlet to a gas turbine.

FIG. 1 depicts an embodiment of a method and apparatus for chilling the ambient air 100 that is drawn through the air inlet of a gas combustion turbine generator. According to an embodiment, the ambient air 100 can be drawn through an inlet air louver 102 and air housing 104 into an air compressor 126, combustion chamber 128 and gas turbine 130 that is used to drive an electric power generator 132. As the ambient 100 is drawn through the air housing 104 it can be filtered through pre and high efficiency filters 120 and 122 in order to protect the mechanical operation of the gas turbine 130. A well-known characteristic of a gas turbine 130 is that as the temperature of the ambient air 100 increases thereby reducing its density, the output energy delivered to the generator 132 is reduced. In order to compensate for the effects of increases to the ambient air 100, an air cooling system, such as shown at 10 and 20 in FIG. 1, can be included in the air housing 104. When an air cooling system is included, it has been common practice to us a single, and not as frequently multiple, indirect contact air chillers, which are comprised of series of tubes through which chilled water circulates so that the air which contacts the outside of the tubes can be cooled. In order to enhance this heat exchange between the air on the outside and the water inside the tubes, fins are typically attached to the outside of the tube so there is more surface contact with the air. An example of this indirect air chiller is shown in an alternate embodiment depicted in FIG. 3 as item 116.

Figure 2:
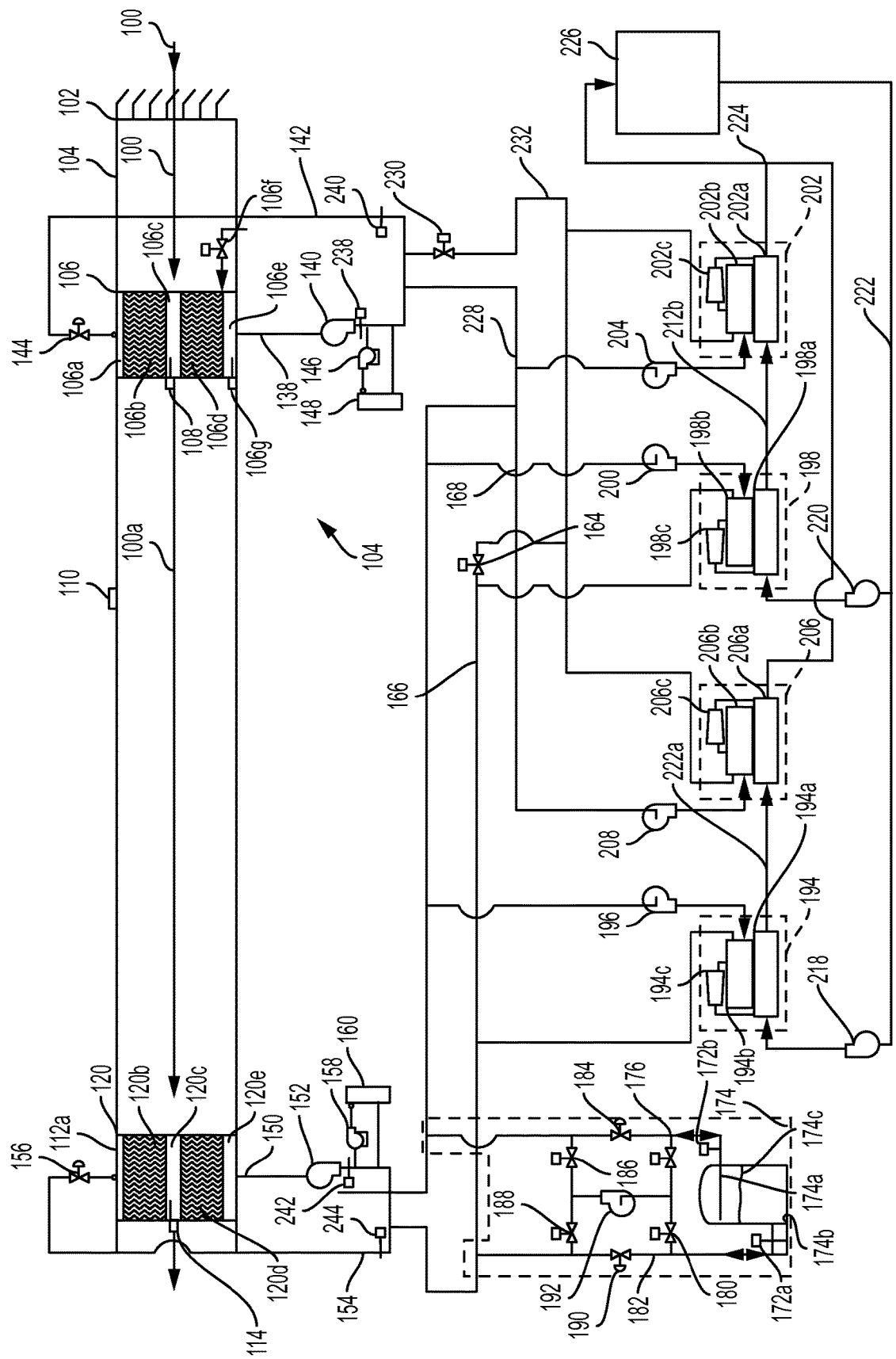
FIG. 2 is a schematic that shows a multiple parallel water chiller extension according to an illustrative embodiment.

Embodiments of the invention can use multiple direct contact air coolers shown as item 106 and 112 on FIG. 1. The water that is supplied to these direct contact air chillers can be chilled by water chiller units, such as 194 and 206 with evaporators 194b and 206b respectively, that are arranged in parallel with other water chiller units in separate water chiller systems 30 and 40, example of which are depicted in FIG. 2. Ambient air enters the first direct contact air chiller 106 at conditions which are as high as 122° F. (50° C.) at 25% relative humidity and passes through polyvinylchloride sheets 106b over which chilled water is circulated by action of secondary chilled water pump 140. Alternative embodiments can use materials such as stainless steel (SS), Polypropylene (PP), Polyethylene Terephthalate (PET), High-Density Polyethylene (HDPE), or other materials known to one of ordinary skill in the art, instead of the polyvinylchloride sheets described herein. Chilled water enters the direct contact air chiller 106 through flow control valve 144 from supply pipe 142. Once inside the direct contact air chiller 106 the water can be distributed through channel 106a to all polyvinylchloride sheets 106b equally, however, unequal distributions are also possible. These polyvinylchloride sheets 106b can be arranged substantially vertically so that the water will fall to a water basin/distribution channel 106c. As the water falls across polyvinylchloride sheets 106b it comes in direct contact with the ambient air 100 thus cooling the ambient air 100 to a lower temperature and total heat content at 100a. Water level sensor 108 placed in water basin/distribution channel 106c directly modulates flow control valve 144 through a range of positions from full closed to full open in order to maintain the set level in water basin/distribution channel 106c. The water can then be distributed through basin/distribution channel 106c to all polyvinylchloride sheets 106d equally; however, unequal distributions are also possible. These polyvinylchloride sheets 106d can be arranged substantially vertically so that the water will fall to a water basin 106e. As the water falls across polyvinylchloride sheets 106b it comes in direct contact with the ambient air 100 thus cooling the ambient air 100 to a lower temperature and total heat content at 100a. The water in basin 106e is drained into pipe 138 and then flows to the inlet of pump 140 which has its speed varied by an electronic controller which maintains the water pressure set point for a pressure sensor 238 that is placed at the discharge of pump 140 in pipe 142. In an alternate embodiment of the direct contact air chiller, chilled water can be distributed to and through channel 106a and channel 106c in parallel.

The water circulated by secondary chilled water pump 140 can be drawn into a filtering circuit by water filtration pump 146 and then discharged into water filtration equipment 148 where solids are filtered and separated from the water before being injected back into the secondary chilled water circuit. The temperature of the water supplied to direct contact air chiller 106 is continuously monitored at sensor 240 and adjusted through an automation system controller which can use one or more of ambient air 100 conditions, desired gas turbine 130 inlet air conditions 100b, and water chilling systems 30 and 40 energy efficiency optimization programs to determine a set point temperature for water chilling system 30. The water chiller unit or units in water chilling system 30, such as item 206 shown on FIG. 1, can be continually controlled to maintain that set point temperature for water chilling. The ambient air temperature and relative humidity conditions after passing through air chiller 106 can be monitored at sensors 110 and the ambient air temperature and relative humidity conditions after passing through air chiller 112 can be monitored at sensors 124.

According to embodiments, when water chilling is activated to maintain the chilled water set point temperature at sensor 240, the water chilling system primary chilled water pumps such as pump 208 will activate. Water is drawn by the constant speed primary chilled water pump 208 from the secondary chilled water circuit that serves air chiller system 10 through primary chilled water return pipe 228 to evaporator 206b in water chiller unit 206. The chilled water set point temperature determined for system water chilling system 30 can cause the controls that are part of water chiller unit 206 to adjust operation of the compressor 206c to satisfy the set point for sensor 240. Water supplied from evaporator 206b can be supplied through primary chilled water supply pipe 232 to the secondary chilled water system in air chilling system 10 through connection to secondary chilled water supply pipe 142.

Heat removed from the ambient air 100 in the evaporator 206b of the water chiller unit 206 can be transferred to the coolant water in the condenser 206a in the water chiller units by action of its compressor 206c. Coolant water can be circulated to the condenser 206a by action of the condenser water circulating pump 218 first through condenser 194a in water chiller unit 194 in water chilling system 40 and then coolant water supply pipe 222a. From condenser 206a the coolant water can be circulated to heat rejection apparatus, for example, cooling tower 226 through coolant water return pipe 224.

Particles that may be suspended in the ambient air 100 drawn through direct contact air chiller 106 by action of the gas combustion turbine 130 can be cleaned from the ambient air 106 through contact with chilled water on polyvinylchloride sheets 106b and 106d. This action reduces the filtration load on pre and high efficiency filters 120 and 122.

Ambient air 100b that has been cooled, dehumidified and filtered by passing through direct contact air chiller 106 is drawn into and through direct contact air chiller 112 and passes through polyvinylchloride sheets 112b over which chilled water is circulated by action of secondary chilled water pump 152. Chilled water enters the direct contact air chiller 112 through flow control valve 156 from supply pipe 154. Once inside the direct contact air chiller 112 the water is distributed through channel 112a to all polyvinylchloride sheets 112b equally, however, unequal distributions are also possible. These polyvinylchloride sheets 112b can be arranged substantially vertically so that the water will fall to a water basin/distribution channel 112c. As the water falls across polyvinylchloride sheets 112b it comes in direct contact with the ambient air 100a, thus cooling the ambient air 100a to a lower temperature and total heat content at 100b. Water level sensor 114 placed in water basin/distribution channel 112c directly modulates flow control valve 156 through a range of positions from full closed to full open in order to maintain the set level in water basin/distribution channel 112c. The water can then be distributed through basin/distribution channel 112c to all polyvinylchloride sheets 112d equally, however, unequal distributions are possible. These polyvinylchloride sheets 112d can be arranged substantially vertically so that the water will fall to a water basin 112e. As the water falls across polyvinylchloride sheets 112b it comes in direct contact with the ambient air 100a thus cooling the ambient air 100a to a lower temperature and total heat content at 100b. The water in basin 112e is drained into pipe 150 and then flows to the inlet of pump 152 which has its speed varied by an electronic controller which maintains the water pressure set point for a pressure sensor 242 that is placed at the discharge of pump 152 in pipe 150.

The water circulated by secondary chilled water pump 152 can be drawn into a filtering circuit by water filtration pump 158 and then discharged into water filtration equipment 160 where solids are filtered and separated from the water before being injected back into the secondary chilled water circuit. The temperature of the water supplied to direct contact air chiller 112 can be continuously monitored at sensor 244 and adjusted through an automation system controller which uses, for example, ambient air 100 conditions, and/or desired gas turbine 130 inlet air conditions 100*b*, and/or water chilling 30 and 40 energy efficiency optimization programs to determine a set point temperature for water chilling system 40. The water chiller unit or units or alternate chilled water thermal storage system 170, in water chilling system 40, such as item 194 shown on FIG. 1, can be continually controlled to maintain that set point temperature for water chilling.

When water chilling is activated to maintain the chilled water set point temperature at sensor 244, the primary chilled water pumps of the water chilling system, for example, pump 196 will activate. Water is drawn by the constant speed primary chilled water pump 196 from the secondary chilled water circuit that serves air chiller system 20. For example, the water can be drawn through primary chilled water return pipe 168 to evaporator 194*b* in water chiller unit 194. The chilled water set point temperature determined for system water chilling system 40 can cause the controls that are part of water chiller unit 194 to adjust operation of the compressor 194*c* to satisfy the set point for sensor 244. Water supplied from evaporator 194*b* can be supplied through primary chilled water supply pipe 166 to the secondary chilled water system in air chilling system 20 through connection to secondary chilled water supply pipe 154.

Heat removed from the ambient air 100*a* in the evaporator 194*b* of the water chiller unit 194 can be transferred to the coolant water in the condenser 194*a* in the water chiller units by action of its compressor 194*c*. Coolant water can be circulated to the condenser 194*c* by action of the condenser water circulating pump 218 through coolant water supply pipe 222. From condenser 194*a* the coolant water can be circulated to heat rejection apparatus, such as cooling tower 226, first through condenser 206*a* then through coolant water return pipe 224 then to the inlet of cooling tower 226.

Particles that may be suspended in the ambient air 100*a* drawn through direct contact air chiller 112 by action of the gas combustion turbine 130 can be cleaned from the ambient air 100 an additional time through contact with chilled water on polyvinylchloride sheets 112*b* and 112*d*. This action further reduces the air filtration load on pre and high efficiency filters 120 and 122 respectively.

During periods of reduced ambient air 100 cooling load, especially when the moisture content of the ambient air 100 is low, air chilling can be done through use of the direct contact air chiller 106 in an adiabatic mode of operation. According to embodiments, this mode requires no water chilling operation. This mode can be activated through efficiency algorithms which consider, for example, ambient air 100 temperature and moisture content, and/or electric output requirement for the power generator 132, and/or the set point temperature determined for gas combustion turbine 130 inlet air 100*b*.

When activated in the adiabatic cooling mode, the flow control valve 144 associated with ambient air chiller 106 will open and water level control 106*g* will be enabled to control to the level set point of direct contact air chiller water basin 106*e* through signal to water make up control valve 106*f*. Based on the then current ambient air 100 temperature and moisture content, secondary chilled water pump 140 can be activated. The speed that the secondary chilled water pump 140 will be determined and updated continuously in order to deliver a water flow rate that will minimize the temperature of the ambient air 100*a* at the outlet from direct contact air chiller 106. The ambient air 100 temperature and moisture content can be continuously monitored and the speed of primary chilled water pump 140 can be updated as required to minimize the air temperature at sensor 110.

According to embodiments, air chilling system 20, water chilling systems 30 and 40, and chilled water thermal storage system 170 can be inactive during operation in the adiabatic cooling mode.

In an embodiment of the invention, chilled water provided to air chiller system 20 can be provided by chilled water thermal storage system 170 in parallel with water chiller units, such as water chiller unit 194 within water chilling system 40. In such case water chiller units in water chilling systems 30 and 40 can operate during designated time periods to charge chilled water into the thermal storage tank 170 at a temperature in the range of, for example, about 38° F. to about 42° F., which will be the set point for any water chiller unit that is activated to charge the chilled water thermal storage tank 174. In the charge mode of operation, flow control valves 162, 164, 178 and 186 will be open, flow control valves 230, 180 and 188 will be closed, water level control valve 184 will be closed and water level control valve 190 will be activated to maintain the water level in the thermal storage tank 174. Chilled water thermal storage system circulating pump 192 and primary chilled water pumps in water chiller systems 30 and 40, such as pumps 196 and 208 will be activated. This action can cause flow to be induced from primary chilled water return pipes 168 and 228 to the primary chilled water pumps 196 and 208, to and through the water chiller evaporators 194*b* and 206*b*, through primary chilled water supply pipes 232 and 166, through water level control valve 190 and chilled water pipe 182, to water distribution pipe 174*b* at the bottom of chilled water thermal storage tank 174. Water at or near 40° F. is denser than the warmer temperature water in the tank from the previous discharge mode.

Accordingly, the water entering the bottom of the tank 174 can remain near the bottom, displacing warmer water which will distribute through the thermal storage tank 174 to the tank top water distribution pipe 174*a*. Chilled water thermal storage system pump 192 can draw the warm water through the tank top water distribution pipe 174*a* through chilled water pipe 176 to primary chilled water return pipes 168 and 228 which will direct water back to the primary chilled water pumps 196 and 208. During the charging of the chilled water thermal storage tank, a boundary layer 174*c* of water will form between the cold and warm water. This boundary layer 174*c* has a temperature transition from cold to warm that extends through the boundary layer from its bottom to top which can be approximately 2 feet (600 mm) and is often referred to as a "thermocline." During the charge mode of operation, the thermocline 174*c* moves upwards as the thermal storage tank 174 fills with chilled water. Thus, the warm water leaving the thermal storage tank 174 cools as the thermocline nears the top water distribution pipe 174*a*. According to embodiments, the thermal storage tank charge mode will be terminated when the water temperature monitored at sensor 172*b* at the top connection to the storage tank 174 is less than about 4.0° F. higher than the water temperature monitored at sensor 172*a* at the bottom connection to the storage tank 174.

During the discharge mode of operation for chilled water thermal storage system 170, flow control valves 162, 164, 178 and 186 are closed, flow control valves 230, 180 and 188 are open, and water level control valve 190 is closed. Water level control valve 184 is activated to maintain the set water level in the thermal storage tank 174. Chilled water thermal storage system circulating pump 192 can then be activated. This action will cause flow to be induced from the storage tank 174 through the tank bottom distribution pipe 174b and flow control valve 180 to the inlet of thermal storage system circulating pump 192. From the outlet of thermal storage system circulating pump 192, chilled water circulates through flow control valve 188 and chilled water pipe 182 to primary chilled water supply pipe 166, where it can be combined with flow from water chillers in water chilling system 40 to supply chilled water into the secondary chilled water system that serves air chilling system 20 at pipe 154. Warm water returning from the secondary chilled water system that serves air chilling system 20 circulates through pipe 150 and secondary chilled water pumps 152 to primary water chiller system 40 at the connection with primary chilled water return pipe 168. Water flow from primary chilled water return pipe 168 will then circulate through chilled water pipe 176 and thermal storage tank level control valve 184 into the thermal storage tank 174 through the connection to the tank top water distribution pipe 174a. Since water at or near 40° F. is denser than the warmer temperature water that is entering the thermal storage tank through distribution pipe 174a, the warm water will continue to accumulate near the top of the thermal storage tank 174 while the colder water is reduced in the area below the thermocline 174c.

FIG. 2 illustrates another embodiment of the present invention that arranges multiple water chiller units into water chilling systems 30 and 40. When multiple chiller units are used in water chilling system 30, such as adding water chiller unit 202 to operate with water chiller unit 206, the primary chilled water piping 228 and 230, and primary chilled water pump 204 can be arranged so that the evaporator 202b in water chiller unit 202 operates in parallel with the evaporator 206b in water chiller unit 206 as needed for all modes of operation. When multiple chiller units are used in water chilling system 40, such as adding water chiller unit 198 to operate with water chiller unit 194, the primary chilled water piping 166 and 168, and primary chilled water pump 200 can be arranged so that the evaporator 198b in water chiller unit 198 operates in parallel with the evaporator 194b in water chiller unit 194 as needed for all modes of operation.

In embodiments of water chilling system 30 with multiple water chiller units, when water chilling is activated to maintain the chilled water set point temperature at sensor 240, the water chilling system primary chilled water pumps 204 and 208 will activate. Water is drawn by the constant speed primary chilled water pumps 204 and 208 from the secondary chilled water circuit that serves air chiller system 10 through primary chilled water return pipe 228 to evaporators 202b and 206b in water chiller unit 202 and 206, respectively. The chilled water set point temperature determined for water chilling system 30 can cause the controls that are part of water chiller units 202 and 206 to adjust operation of the compressors 202c and 206c to satisfy the set point for sensor 240. Water supplied from evaporators 202b and 206b can be supplied through primary chilled water supply pipe 232 to the secondary chilled water system in air chilling system 20 through connection to secondary chilled water supply pipe 142.

Heat removed from the ambient air 100 in the evaporators 202b and 206b of the water chiller unit 202 and 206 can be transferred to the coolant water in the condenser 202a and 206a in the water chiller units by action of its compressors 202c and 206c. Coolant water can be circulated to the condenser 202a by action of the condenser water circulating pump 220, for example, first through condensers 198a in water chiller unit 198 in water chilling system 40 and then through coolant water supply pipe 222b. From condenser 202a the coolant water can be circulated to heat rejection apparatus, for example, cooling tower 226, through coolant water return pipe 224. Coolant water can be circulated to the condenser 206a by action of the condenser water circulating pump 218 first through condensers 194a in water chiller unit 194 in water chilling system 40 and then through coolant water supply pipe 222a. From condenser 206a the coolant water can be circulated to heat rejection apparatus, for example, cooling tower 226, through coolant water return pipe 224.

According to embodiments, when water chilling is activated to maintain the chilled water set point temperature at sensor 244, the water chilling system primary chilled water pumps 196 and 200 will activate. Water is drawn by the constant speed primary chilled water pump 196 and 200 from the secondary chilled water circuit that serves air chiller system 20 through primary chilled water return pipe 168 to evaporator 194b in water chiller unit 194 and to evaporator 198b in water chiller unit 198. The chilled water set point temperature determined for system water chilling system 40 can cause the controls that are part of water chiller units 194 and 198 to adjust operation of the compressor 194c and 198c to satisfy the set point for sensor 244. Water supplied from evaporators 194b and 198b can be supplied through primary chilled water supply pipe 166 to the secondary chilled water system in air chilling system 20 through connection to secondary chilled water supply pipe 154.

Heat removed from the ambient air 100a in the evaporator 194b and 198b of the water chiller unit 194 and 198 can be transferred to the coolant water in the condensers 194a and 198a in the water chiller units by action of its compressor 194c and 198c. Coolant water can be circulated to the condenser 194c by action of the condenser water circulating pump 218 through coolant water supply pipe 222. From condenser 194a, the coolant water can be circulated to heat rejection apparatus, for example, cooling tower 226, first through condenser 206a then through coolant water return pipe 224 then to the inlet of cooling tower 226. Coolant water can be circulated to the condenser 198c by action of the condenser water circulating pump 220 through coolant water supply pipe 222. From condenser 198a, the coolant water can be circulated to heat rejection apparatus, for example, cooling tower 226, first through condenser 202a then through coolant water return pipe 224 then to the inlet of cooling tower 226.

According to embodiments, operation of air chilling systems 10 and 20 and chilled water thermal storage system 170 are the same, or substantially the same, as described above in connection with the description for FIG. 1 whenever multiple water chiller units are used.

Embodiments of the invention shown in FIG. 1 and FIG. 2 can provide advantages over the prior art. These advantages can result from, among other things, one or more of the following features. Embodiments can provide an improvement in energy use that is enabled by the direct contact of the chilled water with the ambient air 100 in air chiller 106 and 112. This direct contact can eliminates the resistance to heat transfer that occurs in an indirect contact air chiller, which in turn, can allow the water chiller systems 30 and 40 to provide water at a higher, more efficient chilled water supply temperature than could be the case when either single or multiple indirect air chillers are used.

Additionally or alternatively, embodiments of the invention can provide a substantial reduction in the amount of air borne particulate that enters the pre and high efficiency air filters 120 and 122 respectively. This feature can extend the life and effectiveness of the air filters 120 and 122, for example, by three to four times, when compared against the prior art which places the air filters upstream in the direction of ambient air 100 flow prior to the indirect contact air chiller coils.

Additionally or alternatively, embodiments of the invention can combine the efficiency gained by using direct contact air coolers with using an upstream water chilling system 30 that allows about 35% to about 50% of the total ambient air cooling load to be provided at a chilled water temperature that is more than about 20° F. higher than the chilled water temperature that is required to chill the ambient air to the desired gas combustion turbine inlet air temperature. Embodiments of the invention described herein can provide air chilling system total energy savings of approximately 12% when compared against prior art, and the use of direct contact air coolers in combination with an upstream water chilling system 30 can account for approximately 60% of that total energy savings.

Figure 3:
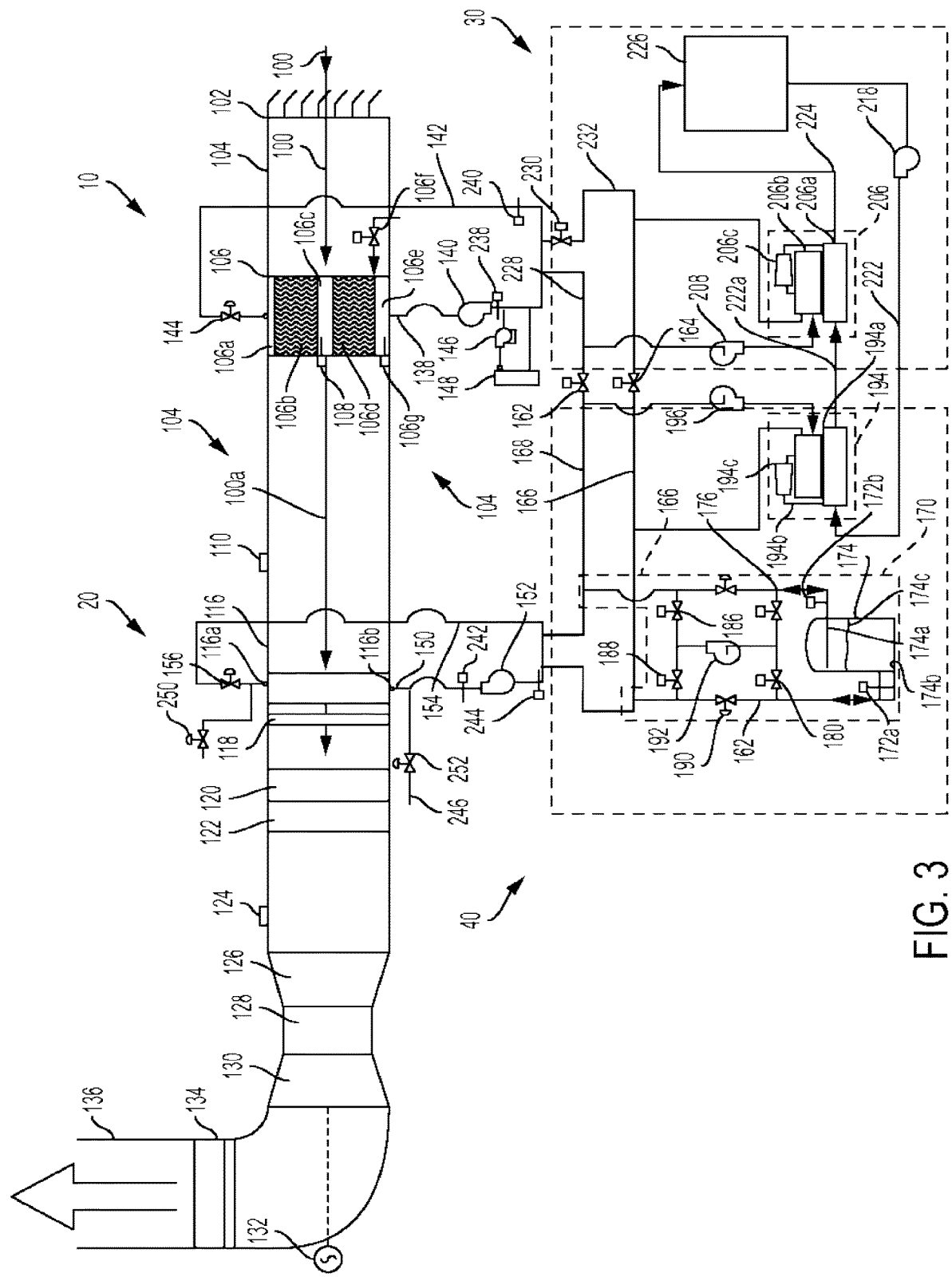
FIG. 3 is a schematic that shows a first alternate embodiment of apparatus in the ambient air chilling system at the air inlet to a gas turbine.

FIG. 3 illustrates an alternate embodiment of the invention presented in FIG. 1. This alternative uses an indirect contact air chiller 116 in place of the direct contact air chiller 112. In this alternative the operation of air chiller system 20 and water chilling system 40 are described in the following manner.

Ambient air 100b that has been cooled, dehumidified and filtered by passing through direct contact air chiller 106 is drawn into and through indirect contact air chiller 116. Chilled water enters the supply connection 116a to the tubes in the indirect contact air chiller 116 through flow control valve 156 from supply pipe 154. Once inside the indirect contact air chiller 116, the water is distributed through all tube rows equally thus cooling the ambient air 100a to a lower temperature and total heat content at 100b. However, according to alternative embodiments, the water can be distributed unequally through the tube rows. The air temperature and relative humidity sensors 124 placed in the ambient air 100b at the air exit from indirect contact air chiller directly modulate flow control valve 156 through a range of positions from full closed to full open in order to maintain the set point temperature for the ambient air 100b as monitored by sensor at the entrance to the gas combustion turbine 130. The water in indirect contact air chiller 116 then exits through chilled water return connection 116b and then flows to the inlet of pump 152 which has its speed varied by an electronic controller which maintains the water pressure set point for a pressure sensor 242 that is placed at the discharge of pump 152 in pipe 150.

The temperature of the water supplied to indirect contact air chiller 116 can be continuously monitored at sensor 244 and adjusted through an automation system controller which uses, for example, ambient air 100 conditions, and/or desired gas turbine 130 inlet air conditions 100b, and/or water chilling systems 30 and 40 energy efficiency optimization programs to determine a set point temperature for water chilling system 40. The water chiller unit or units or alternate chilled water thermal storage system 170, in water chilling system 40, such as item 194 shown on FIG. 1, can be continually controlled to maintain that set point temperature for water chilling.

When water chilling is activated to maintain the chilled water set point temperature at sensor 244, the water chilling system primary chilled water pumps, such as pump 196, will activate. Water can be drawn by the constant speed primary chilled water pump 196 from the secondary chilled water circuit that serves air chiller system 20 through primary chilled water return pipe 168 to evaporator 194b in water chiller unit 194. The chilled water set point temperature determined for system water chilling system 40 can cause the controls that are part of water chiller unit 194 to adjust operation of the compressor 194c to satisfy the set point for sensor 244. Water supplied from evaporator 194b can be supplied through primary chilled water supply pipe 166 to the secondary chilled water system in air chilling system 20 through connection to secondary chilled water supply pipe 154.

Heat removed from the ambient air 100a in the evaporator 194b of the water chiller unit 194 can be transferred to the coolant water in the condenser 194a in the water chiller units by action of its compressor 194c. Coolant water can be circulated to the condenser 194c by action of the condenser water circulating pump 218 through coolant water supply pipe 222. From condenser 194a, the coolant water can be circulated to heat rejection apparatus, for example, cooling tower 226 first through condenser 206a then through coolant water return pipe 224 then to the inlet of cooling tower 226.

In this embodiment waste heat in the form of steam or heated water can be supplied by heat recovery steam generator 134 that captures heat from the exhaust gas 136 discharged from gas combustion turbine 130. Heat to drive the heating of the ambient air 100 can be provided from the heat recovery steam generator 134 through supply pipe 248. The flow of steam or heated water can be regulated by flow control valve 250 in order to maintain the temperature set point for sensor 124 at the inlet of the gas combustion turbine 130. Return of the steam condensate or heated water to the heat recovery steam generator 134 can be through flow control valve 252 and pipe 246.

According to embodiments, the description for ambient air chilling system 10, water chilling system 30, and chilled water thermal storage system 170 are the same or substantially the same as stated in the description for FIG. 1.

Figure 4:
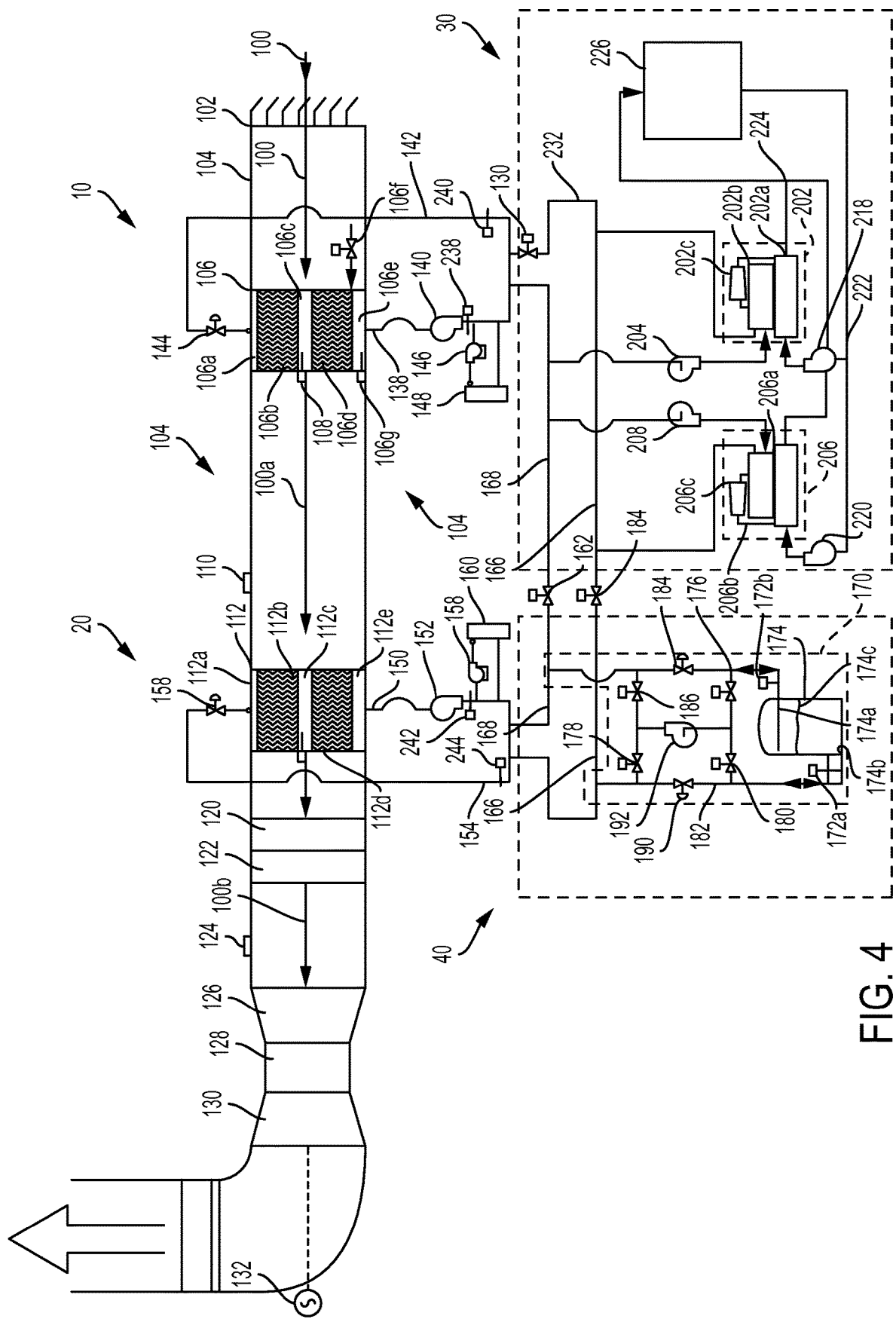
FIG. 4 is a schematic that shows a second alternate embodiment of apparatus in the ambient air chilling system at the air inlet to a gas turbine.

FIG. 4 illustrates another alternate embodiment of the invention presented in FIG. 1. This alternative uses chilled water thermal storage for all chilling that is provided by water chilling system 40 and therefore all air chilling that is provided by air chilling system 20. In this alternative, the operation of air chiller system 20 and water chilling system 30 are described in the following manner.

In the embodiment of FIG. 4, water chiller units in water chilling system 30 operate during designated time periods to charge chilled water into the thermal storage tank 170 at a temperature in the range of, for example, about 38° F. to about 42° F., which will be the set point for any water chiller unit that is activated to charge the chilled water thermal storage tank 174. In the charge mode of operation, flow control valves 162, 164, 178 and 186 are open, flow control valves 230, 180 and 188 are closed, water level control valve 184 is closed and water level control valve 190 is activated to maintain the set water level in the thermal storage tank 174. Chilled water thermal storage system circulating pump 192 and primary chilled water pumps in water chiller systems 30, such as pumps 204 and 208, will be activated. This action can cause flow to be induced from primary chilled water return pipes 168 and 228 to the primary chilled water pumps 204 and 208, to and through the water chiller evaporators 202b and 206b, through primary chilled water supply pipes 232 and 166, through water level control valve 190 and chilled water pipe 182, to water distribution pipe 174b at the bottom of chilled water thermal storage tank 174. Since water at or near 40° F. is denser than the warmer temperature water in the tank from the previous discharge mode, the water entering the bottom of the tank 174 will remain near the bottom, displacing warmer water which will distribute through the thermal storage tank 174 to the tank top water distribution pipe 174a. Chilled water thermal storage system pump 192 can draw the warm water through the tank top water distribution pipe 174a through chilled water pipe 176 to primary chilled water return pipes 168 and 228 which will communicate water back to the primary chilled water pumps 196 and 208. During the charging of the chilled water thermal storage tank, a boundary layer 174c of water will form between the cold and warm water. This boundary layer 174c has a temperature transition from cold to warm that extends through the boundary layer from its bottom to top which is approximately 2 feet (600 mm) and is often referred to as a "thermocline." During the charge mode of operation, the thermocline 174c moves upwards as the thermal storage tank 174 fills with chilled water. Thus, the warm water leaving the thermal storage tank 174 will cool as the thermocline nears the top water distribution pipe 174a and the thermal storage tank charge mode will be terminated when the water temperature monitored at sensor 172b at the top connection to the storage tank 174 is less than about 4.0° F. higher than the water temperature monitored at sensor 172a at the bottom connection to the storage tank 174.

In the discharge mode of operation for chilled water thermal storage system 170, flow control valves 162, 164, 178 and 186 are closed, flow control valves 230, 180 and 188 are open, water level control valve 190 are closed and water level control valve 184 are activated to maintain the set water level in the thermal storage tank 174. Chilled water thermal storage system circulating pump 192 will then be activated. This action will cause water flow to be induced from the storage tank 174 through the tank bottom distribution pipe 174b and flow control valve 180 to the inlet of thermal storage system circulating pump 192. From the outlet of thermal storage system circulating pump 192, chilled water will circulate through flow control valve 188 and chilled water pipe 182 to primary chilled water supply pipe 166 where it can supply chilled water into the secondary chilled water system that serves air chilling system 20 at pipe 154. The temperature of the water supplied to direct contact air chiller 112 can be continuously monitored at sensor 244 and adjusted through an automation system controller which uses ambient air 100 conditions, and the desired gas turbine 130 inlet air conditions 100 to determine a set point temperature for water chilling system 40. The speed of chilled water thermal storage system circulation pump 192 can be controlled to inject chilled water supply water from thermal storage tank 174 in order to maintain the set point that is determined for water chilling system 40.

Warm water returning from the secondary chilled water system that serves air chilling system 20 can circulate through pipe 150 and secondary chilled water pumps 152 to primary water chiller system 40 at the connection with primary chilled water return pipe 168. Water flow from primary chilled water return pipe 168 can then circulate through chilled water pipe 176 and thermal storage tank level control valve 184 into the thermal storage tank 174 through the connection to the tank top water distribution pipe 174a. Since water at or near 40° F. is denser than the warmer temperature water that is entering the thermal storage tank through distribution pipe 174a, the warm water will continue to accumulate near the top of the thermal storage tank 174 while the colder water is reduced in the area below the thermocline 174c.

As shown in FIG. 4, multiple chiller units are used in water chilling system 30, wherein water chiller unit 202 can operate with water chiller unit 206. The primary chilled water piping 228 and 230 and primary chilled water pumps 204 and 208 can be arranged so that the evaporator 202b in water chiller unit 202 operates in parallel with the evaporator 206b in water chiller unit 206 as needed for supplying chilled water to the secondary chilled water system that serves ambient air chilling system 10.

For embodiments of water chilling system 30 having multiple water chiller units, when water chilling is activated to maintain the chilled water set point temperature at sensor 240, the water chilling system primary chilled water pumps 204 and 208 will activate. Water is drawn by the constant speed primary chilled water pumps 204 and 208 from the secondary chilled water circuit that serves air chiller system 10 through primary chilled water return pipe 228 to evaporators 202b and 206b in water chiller unit 202 and 206, respectively. The chilled water set point temperature determined for system water chilling system 30 can cause the controls that are part of water chiller units 202 and 206 to adjust operation of the compressors 202c and 206c to satisfy the set point for sensor 240. Water supplied from evaporators 202b and 206b can be supplied through primary chilled water supply pipe 232 to the secondary chilled water system in air chilling system 10 through connection to secondary chilled water supply pipe 142.

Heat removed from the ambient air 100 in the evaporators 202b and 206b of the water chiller unit 202 and 206 can be transferred to the coolant water in the condenser 202a and 206a in the water chiller units by action of its compressors 202c and 206c. Coolant water can be circulated in parallel to the condenser 202a and 206a by action of the condenser water circulating pumps 218 and 220, respectively. From condensers 202a and 206a the coolant water can be circulated to heat rejection apparatus, for example, cooling tower 226, through coolant water return pipe 224.

According to embodiments, the description for ambient air chilling system 10 can be the same, or substantially the same, as stated in the description for FIG. 1.

Figure 5:
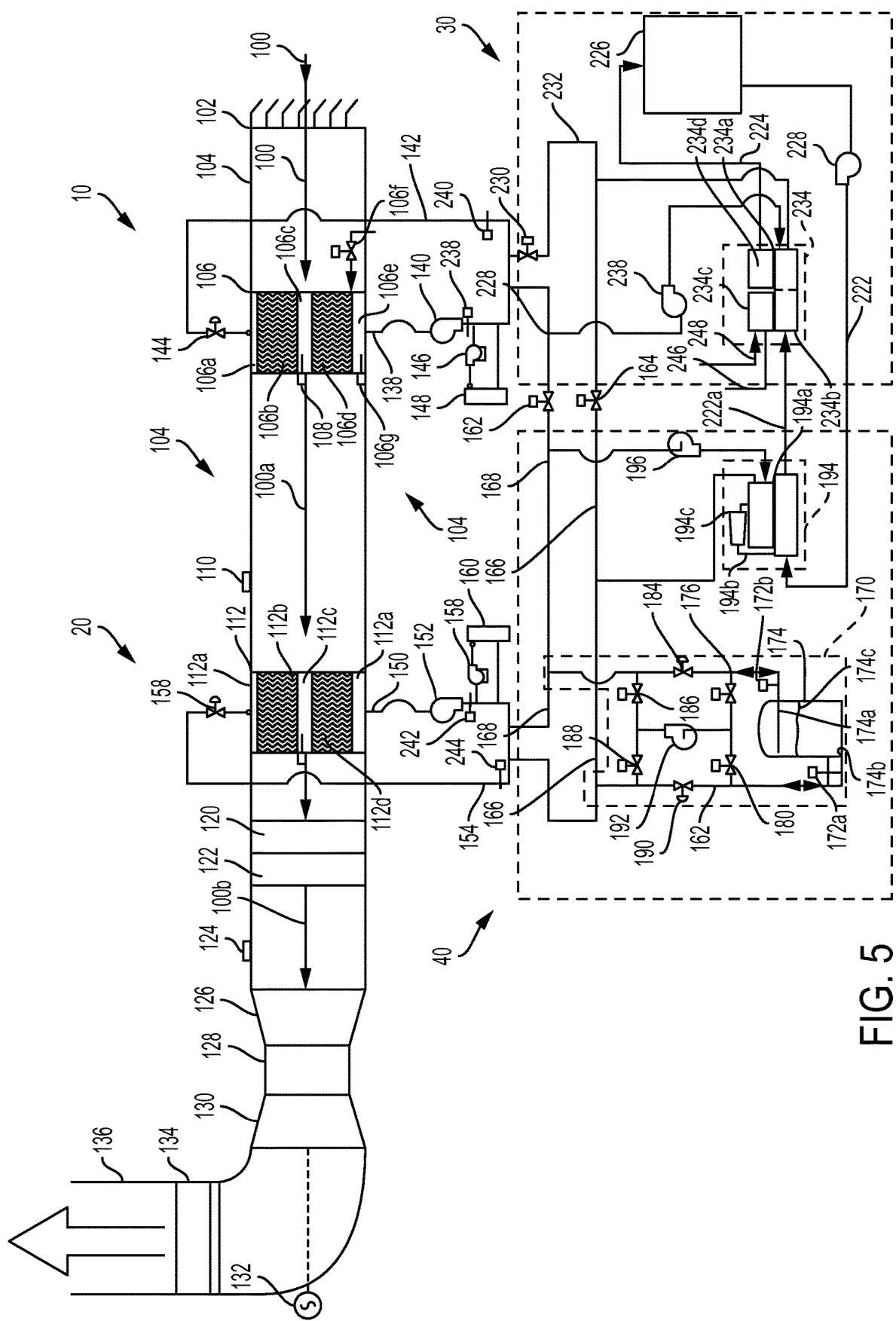
FIG. 5 is a schematic that shows a third alternate embodiment which alters the type of water chiller units that serve the air chilling system at the air inlet to a gas turbine.

FIG. 5 illustrates another alternate embodiment of the invention presented in FIG. 1. This alternative uses at least one waste heat driven lithium bromide absorption water chiller unit in lieu of electric driven water chiller units to supply all chilling that is provided by water chilling system 30, and therefore all air chilling that is provided by air chilling system 10. In this alternative the operation of water chiller system 30 is described in the following manner.

Waste heat in the form of steam or heating water can be supplied by heat recovery steam generator 134 that captures heat from the exhaust gas 136 discharged from gas combustion turbine 130. Heat to drive the reaction in the absorption chiller unit and produce water as cold as, for example, about 40° F. can be provided from the heat recovery steam generator through supply pipe 246. Return of the steam or heating water to the heat recovery steam generator 134 occurs through pipe 246.

When water chilling is activated to maintain the chilled water set point temperature at sensor 240, the water chilling system primary chilled water pumps, such as pump 236, will activate. Water can be drawn by the constant speed primary chilled water pump 236 from the secondary chilled water circuit that serves air chiller system 10 through primary chilled water return pipe 228 to evaporator 234a in water chiller unit 234. The chilled water set point temperature determined for system water chilling system 30 can cause the controls that are part of water chiller unit 234 to adjust operation to satisfy the set point for sensor 240. Water supplied from evaporator 234a can be supplied through primary chilled water supply pipe 232 to the secondary chilled water system in air chilling system 10 through connection to secondary chilled water supply pipe 142.

Heat removed from the ambient air 100 in the evaporator 234a of the water chiller unit 234 can be transferred to the coolant water in the condenser 234b in the water chiller unit 234. Coolant water can be circulated to the condenser 234b by action of the condenser water circulating pump 228, first through condenser 194a in water chiller unit 194 in water chilling system 40, and then through coolant water supply pipe 222a. From condenser water outlet at 234d the coolant water can be circulated to heat rejection apparatus, for example, cooling tower 226, through coolant water return pipe 224.

According to embodiments, the description for ambient air chilling systems 10 and 20, water chilling system 40, and chilled water thermal storage system 170 can be the same, or substantially the same, as stated in the description for FIG. 1.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. A direct contact air chiller for chilling inlet air to a gas turbine comprising:
    a first plurality of sheets;
    a second plurality of sheets;
    a first distribution channel configured to receive chilled water from a supply pipe and distribute the chilled water to the first plurality of sheets;
    a second distribution channel located between the first plurality of sheets and the second plurality of sheets, the second distribution channel configured to receive the chilled water directly from the first plurality of sheets and distribute the chilled water to the second plurality of sheets;
    a water level sensor placed in the second distribution channel and configured to sense a water level in the second distribution channel; and
    a flow control valve located on the supply pipe,
    wherein the water level sensor directly modulates the flow control valve through a range of positions in order to maintain a predetermined water level in the second distribution channel, and
    wherein the direct contact air chiller is configured to chill, dehumidify, and filter inlet air flowing through the direct contact air chiller.

2. The direct contact air chiller of claim 1, wherein chilled water distributed to the first plurality of sheets and the second plurality of sheets are configured to chill inlet air by direct contact between the chilled water and inlet air.

3. The direct contact air chiller of claim 2, wherein chilled water distributed to the first plurality of sheets and the second plurality of sheets are configured to mechanically filter particles from the inlet air by direct contact between the chilled water and inlet air.

4. The direct contact air chiller of claim 3, further comprising a water basin for collecting chilled water from the first plurality of sheets and the second plurality of sheets, wherein the water basin is configured to drain the chilled water from the direct contact air chiller.

5. The direct contact air chiller of claim 3, wherein the first plurality of sheets and the second plurality of sheets are selected from the group consisting of polyvinylchloride sheets, polypropylene sheets, polyethylene terephthalate sheets, high-density polyethylene sheets, and stainless steel sheets.

6. The direct contact air chiller of claim 3, wherein each of the first plurality of sheets and the second plurality of sheets are arranged vertically.

7. The direct contact air chiller of claim 3, wherein the first distribution channel is configured to distribute chilled water equally to the first plurality of sheets and wherein the second distribution channel is configured to distribute chilled water equally to the second plurality of sheets.

8. The direct contact air chiller of claim 3, wherein the first distribution channel is configured to distribute chilled water unequally to the first plurality of sheets and wherein the second distribution channel is configured to distribute chilled water unequally to the second plurality of sheets.

9. The direct contact air chiller of claim 1, wherein the range of positions of the flow control valve is between full closed to full open.

10. The direct contact air chiller of claim 1, further comprising a sensor configured to continuously monitor a temperature of the chilled water in the supply pipe, wherein the temperature of the chilled water is configured to be adjusted through an automation system controller based on one or more of ambient air conditions, desired gas turbine inlet air conditions, energy efficiency optimization programs of a water chilling system.

11. A system comprising:
    the direct contact air chiller of claim 1;
    an indirect contact air chiller; and
    one or more water chilling systems,
    wherein inlet air is chilled, dehumidified, and filtered in the direct contact air chiller before being drawn into and through the indirect contact air chiller.

12. A method of chilling inlet air to the gas turbine comprising:
    supplying chilled water to the direct contact air chiller of claim 1;
    distributing chilled water to the first and second plurality of sheets;
    directly contacting inlet air with the chilled water distributed to the first and second plurality of sheets;
    chilling inlet air with the chilled water distributed to the first and second plurality of sheets; and
    filtering inlet air with the chilled water distributed to the first and second plurality of sheets.

13. The method of chilling inlet air of claim 12, wherein directly contacting inlet air with the chilled water distributed to the first and second plurality of sheets simultaneously chills and filters the inlet air.

14. The method of chilling inlet air of claim 12, wherein distributing chilled water to the first and second plurality of sheets comprises equally distributing chilled water to the first and second plurality of sheets.

15. The method of chilling inlet air of claim 12, wherein distributing chilled water to the first and second plurality of sheets comprises unequally distributing chilled water to the first and second plurality of sheets.

16. The method of chilling inlet air of claim 12, wherein filtering inlet air comprises mechanically filtering particles from the inlet air with the chilled water distributed to the first and second plurality of sheets.

17. The method of chilling inlet air of claim 16, further comprising draining the chilled water from the first and second plurality of sheets after mechanically filtering particles from the inlet air, and pumping chilled water having the filtered particles therein through a filtering circuit in order to remove the particles from the chilled water.

18. The method of chilling inlet air of claim 12, further comprising providing the first and second distribution channels for distributing chilled water to the first and second plurality of sheets, and providing a water basin for draining chilled water from the first and second plurality of sheets.

19. The method of chilling inlet air of claim 18, further comprising sensing the water level in the second distribution channel and the water level in the water basin.

20. The method of chilling inlet air of claim 18, further comprising maintaining the predetermined water level in the second distribution channel and a predetermined water level in the water basin.

\* \* \* \* \*